(12) United States Patent
Rimmer et al.

(10) Patent No.: US 9,138,945 B2
(45) Date of Patent: Sep. 22, 2015

(54) LOAD CARRYING APPARATUS AND METHOD OF MANUFACTURE

(75) Inventors: Timothy Rimmer, Stroud Glos (GB); Peter Morris, Cirencester Glos (GB)

(73) Assignee: Paxxal Inc., Tortola (VG)

( * ) Notice: Subject to any disclaimer, the term of this patent is extended or adjusted under 35 U.S.C. 154(b) by 0 days.

(21) Appl. No.: 11/912,852

(22) PCT Filed: Apr. 26, 2006

(86) PCT No.: PCT/GB2006/001523
§ 371 (c)(1),
(2), (4) Date: Oct. 26, 2007

(87) PCT Pub. No.: WO2006/114622
PCT Pub. Date: Nov. 2, 2006

(65) Prior Publication Data
US 2008/0190332 A1   Aug. 14, 2008

(30) Foreign Application Priority Data
Apr. 26, 2005   (GB) .................................. 0508419.9

(51) Int. Cl.
*B65D 19/38*   (2006.01)
*B29C 70/58*   (2006.01)
*B29C 41/00*   (2006.01)
*B29C 41/04*   (2006.01)
*B29C 41/22*   (2006.01)
(Continued)

(52) U.S. Cl.
CPC .............. *B29C 70/58* (2013.01); *B29C 41/003* (2013.01); *B29C 41/04* (2013.01); *B29C 41/22* (2013.01); *B29C 44/0461* (2013.01); *B65D 19/0002* (2013.01); *B65D 19/0006* (2013.01); *B65D 2519/00044* (2013.01); *B65D 2519/00079* (2013.01); *B65D 2519/00268* (2013.01); *B65D 2519/00273* (2013.01); *B65D 2519/00288* (2013.01); *B65D 2519/00318* (2013.01); *B65D 2519/00338* (2013.01); *B65D 2519/00363* (2013.01); *B65D 2519/00562* (2013.01); *B65D 2519/00567* (2013.01)

(58) Field of Classification Search
CPC ............................................. B65D 2519/00034
USPC ................ 108/57.25, 901, 902, 51.11, 57.26, 108/57.27, 57.28
See application file for complete search history.

(56) References Cited

U.S. PATENT DOCUMENTS

| | | | |
|---|---|---|---|
| 2,699,912 A | 1/1955 | Cushman | |
| 3,268,636 A | 8/1966 | Angell, Jr. | |
| 3,330,228 A * | 7/1967 | Donnelly | 108/57.27 |

(Continued)

FOREIGN PATENT DOCUMENTS

| | | |
|---|---|---|
| CH | 399320 A | 3/1966 |
| DE | 2133387 A1 | 1/1973 |

(Continued)

*Primary Examiner* — Jose V Chen
(74) *Attorney, Agent, or Firm* — Woodard, Emhardt, Moriarty, McNett & Henry LLP (57) ABSTRACT

A polymeric load carrying apparatus (10) and method of manufacture is disclosed. The apparatus comprises an outer shell composition and a filled inner core composition within the outer shell composition. The outer shell composition comprises less than 10% filler, and preferably substantially no filler, by weight, and the inner core composition comprises more than 15% filler, and preferably at least 40% filler, by weight. The filler is preferably a mineral sand.

19 Claims, 8 Drawing Sheets

(51) Int. Cl.
  *B29C 44/04* (2006.01)
  *B65D 19/00* (2006.01)

(56) References Cited

U.S. PATENT DOCUMENTS

| | | | |
|---|---|---|---|
| 3,526,195 A | | 9/1970 | Maryonovich |
| 3,581,681 A | * | 6/1971 | Newton .................. 108/901 |
| 3,636,888 A | | 1/1972 | Angelbeck, Jr. |
| 3,664,271 A | | 5/1972 | Wolder et al. |
| 3,719,157 A | * | 3/1973 | Arcocha et al. ............ 108/57.25 |
| 3,749,153 A | | 7/1973 | Fauquembergue et al. |
| 3,757,704 A | * | 9/1973 | Allgeyer et al. ............. 108/901 |
| 3,824,933 A | | 7/1974 | Lind |
| 3,835,792 A | | 9/1974 | Wharton |
| 3,951,078 A | | 4/1976 | Fowler et al. |
| 3,964,400 A | | 6/1976 | Brand |
| 3,966,386 A | | 6/1976 | Beyer-Olsen et al. |
| 4,237,083 A | * | 12/1980 | Young et al. .................... 264/41 |
| 4,319,925 A | | 3/1982 | Brown |
| 4,597,338 A | | 7/1986 | Kreeger |
| 4,624,818 A | | 11/1986 | Black et al. |
| 4,898,697 A | | 2/1990 | Horton |
| 4,952,350 A | | 8/1990 | Duffy et al. |
| 4,956,135 A | | 9/1990 | Payne |
| 5,253,607 A | | 10/1993 | Chen |
| 5,401,456 A | * | 3/1995 | Alesi et al. .................... 264/511 |
| 5,505,141 A | * | 4/1996 | Barber .......................... 108/901 |
| 5,666,886 A | | 9/1997 | Alexander et al. |
| 5,687,652 A | * | 11/1997 | Ruma ....................... 108/57.25 |
| 5,883,165 A | | 3/1999 | Krohnke et al. |
| 6,006,677 A | | 12/1999 | Apps et al. |
| 6,022,208 A | | 2/2000 | Padovani |
| 6,029,583 A | | 2/2000 | LeTrudet |
| 6,083,434 A | | 7/2000 | Strebel |
| 6,109,190 A | | 8/2000 | Hale et al. |
| 6,515,058 B1 | | 2/2003 | Tomiyama et al. |
| 6,659,020 B1 | | 12/2003 | Ball |
| 6,705,237 B2 | * | 3/2004 | Moore et al. ............... 108/57.25 |
| 6,758,148 B2 | * | 7/2004 | Torrey et al. .............. 108/57.25 |
| 6,784,234 B2 | * | 8/2004 | Adedeji et al. ................ 524/140 |
| 6,886,475 B2 | | 5/2005 | Apps et al. |
| 7,026,375 B1 | | 4/2006 | Stevens |
| 7,186,457 B1 | * | 3/2007 | Zehner et al. ................. 428/326 |
| 7,216,592 B2 | * | 5/2007 | Krech et al. .................. 108/185 |
| 7,408,056 B2 | * | 8/2008 | Medoff et al. ................... 536/56 |
| 7,413,698 B2 | * | 8/2008 | Bearse et al. ................. 264/511 |
| 7,569,107 B2 | * | 8/2009 | Boyer et al. .................. 106/481 |
| 2001/0029874 A1 | * | 10/2001 | Muirhead .................. 108/57.25 |
| 2002/0030597 A1 | | 3/2002 | Muirhead |
| 2002/0043184 A1 | * | 4/2002 | Apps .......................... 108/57.25 |
| 2002/0088379 A1 | | 7/2002 | Phillips et al. |
| 2002/0112653 A1 | | 8/2002 | Moore, Jr. et al. |
| 2002/0119215 A1 | | 8/2002 | Ettlinger et al. |
| 2002/0156162 A1 | | 10/2002 | Stadler |
| 2004/0007164 A1 | | 1/2004 | Herring et al. |
| 2004/0041290 A1 | | 3/2004 | Barich |
| 2005/0166804 A1 | | 8/2005 | Hansen |

FOREIGN PATENT DOCUMENTS

| | | |
|---|---|---|
| DE | 2909541 A | 9/1980 |
| DE | 200205013500 U1 | 11/2005 |
| EP | 0030582 A1 | 6/1981 |
| EP | 0134405 A2 | 3/1985 |
| EP | 0157506 A1 | 10/1985 |
| EP | 0297801 A | 1/1989 |
| EP | 0305082 A1 | 3/1989 |
| EP | 0400640 A1 | 12/1990 |
| EP | 0416668 A2 | 3/1991 |
| EP | 0744129 A1 | 11/1996 |
| EP | 0810079 A1 | 12/1997 |
| EP | 1362794 A2 | 11/2003 |
| EP | 1500599 A | 1/2005 |
| GB | 182150 A | 7/1922 |
| GB | 723691 | 2/1955 |
| GB | 727098 A | 3/1955 |
| GB | 965301 A | 4/1961 |
| GB | 1063485 A | 3/1967 |
| GB | 1069385 A | 5/1967 |
| GB | 1200827 A | 8/1970 |
| GB | 1246090 A | 9/1971 |
| GB | 1310898 B | 3/1973 |
| GB | 1365582 B | 9/1974 |
| GB | 1467486 A | 3/1977 |
| GB | 2093430 A | 9/1982 |
| GB | 2166708 A | 5/1986 |
| GB | 2194213 A | 3/1988 |
| GB | 2228891 A | 9/1990 |
| GB | 2280420 A | 2/1995 |
| GB | 2328396 A | 2/1999 |
| GB | 2340835 A | 3/2000 |
| GB | 2347426 A | 9/2000 |
| GB | 2364953 A | 2/2002 |
| GB | 2411638 A | 9/2005 |
| GB | 2412106 A | 9/2005 |
| GB | 2412107 A | 9/2005 |
| GB | 2412108 A | 9/2005 |
| GB | 2413331 A | 10/2005 |
| JP | 61158410 A | 7/1986 |
| JP | 11129288 A | 5/1999 |
| JP | 2001097379 A | 4/2001 |
| JP | 2002283390 A | 10/2002 |
| JP | 2003054556 A | 2/2003 |
| JP | 2003118738 A | 4/2003 |
| JP | 2006183444 A | 7/2006 |
| NL | 9300189 A | 5/1993 |
| WO | 8705580 A | 9/1987 |
| WO | WO9603322 A1 | 2/1996 |
| WO | 9615892 A | 5/1996 |
| WO | WO9615892 A1 | 5/1996 |
| WO | 9738839 A | 10/1997 |
| WO | W003045801 A2 | 6/2003 |
| WO | WO2005011455 A1 | 2/2005 |
| WO | 2005090175 A2 | 9/2005 |
| WO | WO2006119993 A1 | 11/2006 |

* cited by examiner

LOAD CARRYING APPARATUS AND METHOD OF MANUFACTURE

CROSS-REFERENCE TO RELATED APPLICATIONS

This application is a National Phase Application of PCT Application Number PCT/GB2006/001523 filed Apr. 26, 2006, which claims the benefit of and priority to GB application number GB 0508419.9 filed Apr. 26, 2005.

TECHNICAL FIELD

The present invention relates to load carrying apparatus and methods of manufacturing such apparatus and in particular to load carrying apparatus, such as pallets, comprising a polymer.

BACKGROUND ART

Apparatus for storing and transportation of goods, particularly bulk goods, has to be robust enough to withstand the high impact stresses and adverse environmental conditions that it may encounter during normal operation.

Wooden pallets for storing and transporting goods are well known in the art and are defined by standards such as ISO Standard No. 6780. Such pallets are strictly defined in the standard, and other standards define the tests to which they must be subjected before being judged to be fit for use.

However, wooden pallets suffer from a number of disadvantages. They are susceptible to rotting, and woodworm, which means that their working life is relatively short, and they may endanger the goods carried on them. They are relatively easy to pierce with sharp objects, relatively heavy, and difficult to recycle.

The Applicant's co-pending United Kingdom Patent Application Numbers 0406272.5, 0414991.0, 0425943.8, 0505607.2 are incorporated herein by reference.

It is an object of at least one of the preferred embodiments of the present invention to overcome or ameliorate at least one of the deficiencies of the prior art, or at least to provide a suitable alternative thereto.

SUMMARY OF THE INVENTION

According to a first aspect of the invention there is provided a polymeric load carrying apparatus comprising:
an outer shell composition; and
a filled inner core composition within the outer shell composition,
wherein the outer shell composition comprises less than 10% filler by weight and the inner core composition comprises at least 15% filler by weight.

Advantageously, since there is a significant difference of filler between the inner core composition and the outer shell composition, the inner core is more stiff and harder than the outer shell; the outer shell is relatively softer than the inner core and more flexible. The outer shell of the pallet therefore acts as an impact absorbing layer to prevent impact damage occurring to the inner core of the pallet. The pallet, being able to maintain a higher inner structural integrity, is therefore better able to prevent damage compared to either a hollow pallet or a solid homogeneous pallet of similar design.

Preferably, the inner core composition is foamed.

Preferably, the filler comprises a mineral filler. Preferably, the mineral filler comprises a silicate material, preferably sand. Alternatively, the mineral filler may comprise a carbonate, preferably calcium carbonate.

Preferably, the outer shell composition comprises less than 5% mineral filler by weight, and more preferably the outer shell composition comprises substantially no filler.

Preferably, the inner core composition comprises at least 20% mineral filler by weight, and more preferably the inner core composition comprises at least 40% mineral filler by weight.

Preferably, the inner core and outer shell compositions comprise polyethylene and more preferably HDPE.

Preferably, the inner core composition comprises foamed HDPE having a density of about 0.8 to 0.98 g/cm$^3$, preferably 0.90 to 0.96 g/cm$^3$ and more preferably 0.952 g/cm$^3$.

Preferably, the apparatus is a pallet.

According to another aspect of the invention there is provided a method of manufacturing a load bearing apparatus comprising the steps of:
introducing a first feedstock into a mould, the first feedstock comprising a polymer and less than 10% filler;
rotating and heating the mould to at least partially form an outer shell of the load bearing apparatus, the outer shell having a cavity;
introducing a second feedstock into the cavity of the outer shell to form an inner core within the outer shell, the second feedstock comprising a polymer and at least 15% filler; and
cooling the mould to form the load bearing apparatus.

Preferably, the step of introducing the second feedstock comprises using a foaming agent such that the inner core is foamed.

Preferably, the polymer of both of the first and second feedstocks is polyethylene and more preferably HDPE.

Preferably the filler is a mineral filler and more preferably sand.

According to another aspect of the invention there is provided a load carrying apparatus comprising:
an outer shell composition; and
an inner core composition within the outer shell composition,
wherein each of the outer shell composition and the inner core composition comprise at least one polymer and wherein the inner core composition is more brittle than the outer shell composition.

The foaming agent may comprise any suitable agent which foams when heated and also may include calcium carbonate.

In the specification and claims, references to the outer shell comprising "substantially no filler" is to be understood as comprising "substantially no bulking agents". Optional components of either the outer shell or inner core compositions, such as pigments, for example, are not to be considered as filler for the purposes of the specification and the claims.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENTS

Figure 1:
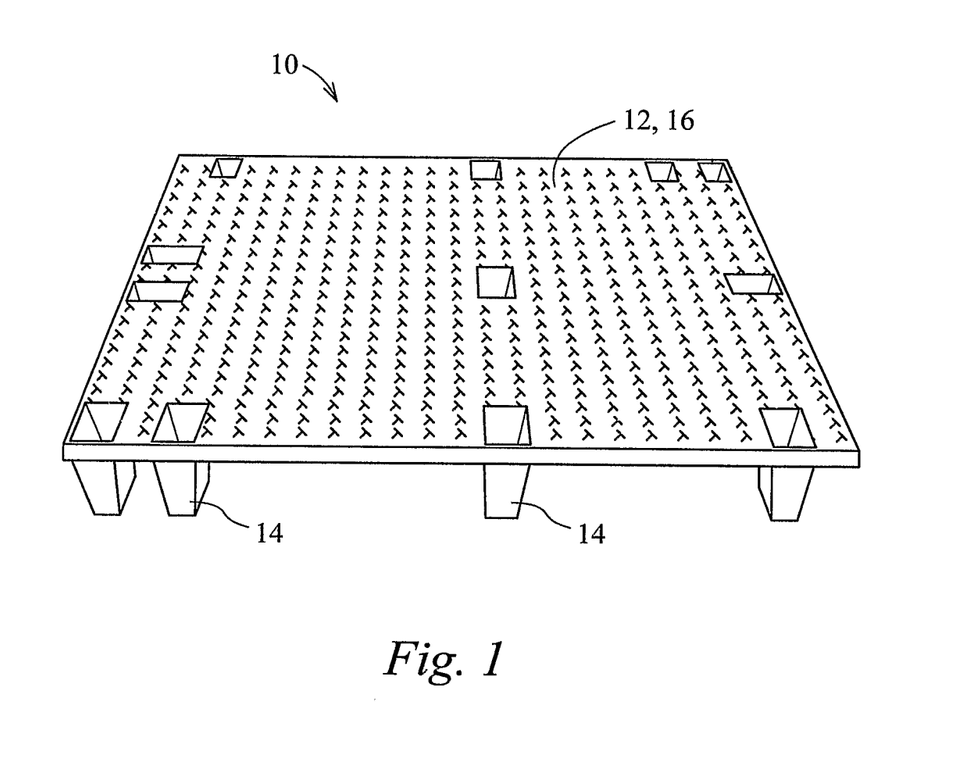
FIG. 1 illustrates a perspective view of a pallet according to an embodiment of the present invention.
Figure 2:
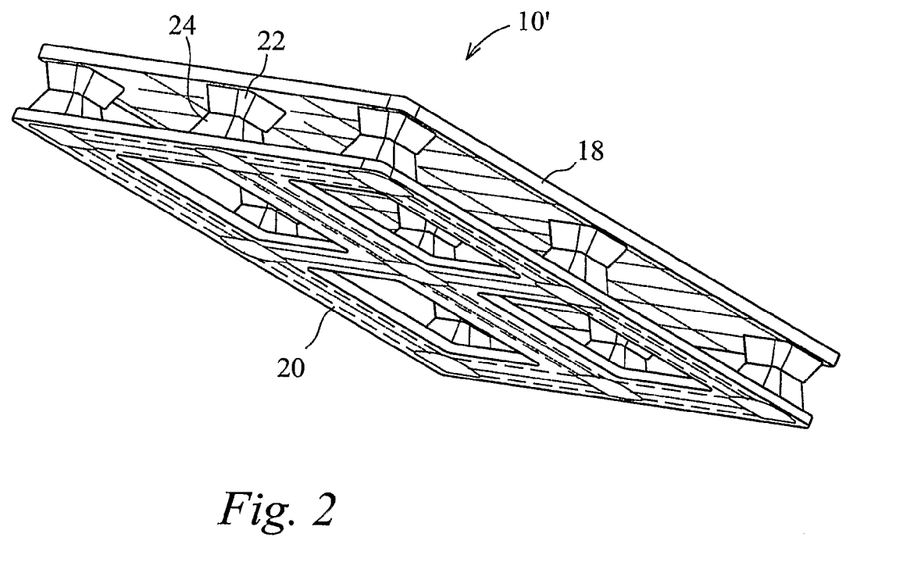
FIG. 2 illustrates a perspective view of a pallet according to another embodiment of the present invention.

Referring to the Figures, FIG. 1 illustrates an embodiment of a load bearing apparatus in the form of a pallet 10 that may be manufactured according to the techniques described herein. The pallet 10 has a substantially rectangular upper surface or platform 12 and a plurality of feet 14 depending from the platform 12.

The feet 14 are moulded integrally with the platform 12 of the pallet 10. In the present embodiment, the pallet includes one or more feet 14 at each corner of the pallet 10, at the centre of the pallet and in the centre of each of the pallet 10. Alternative embodiments of the pallet may comprise more or less feet 14 depending from the platform 12.

The feet 14 of the pallet 10 are at least partially hollow. This reduces the weight of each pallet 10 without significantly reducing pallet strength and hence may allow more goods to be loaded onto the pallet for a given gross weight. A hollow is formed into the feet 14 from the platform 12 of the pallet 10. This allows the pallets 10 to be stacked and nested.

The feet 14 are arranged so that the pallet 10 may be accessed by lifting and maneuvering equipment so that the blades of a forklift truck can fit underneath the pallet platform 12 between respective pairs of feet 14.

The upper surface 16 of the platform 12 of the pallet 10 is provided with an uneven surface, which helps to increase the grip of the surface 16 on objects placed on the surface 16. The platform 12 of the pallet 10 is typically a substantially continuous surface, although holes may be provided in the surface to reduce the weight of the pallet 10.

Figure 3:
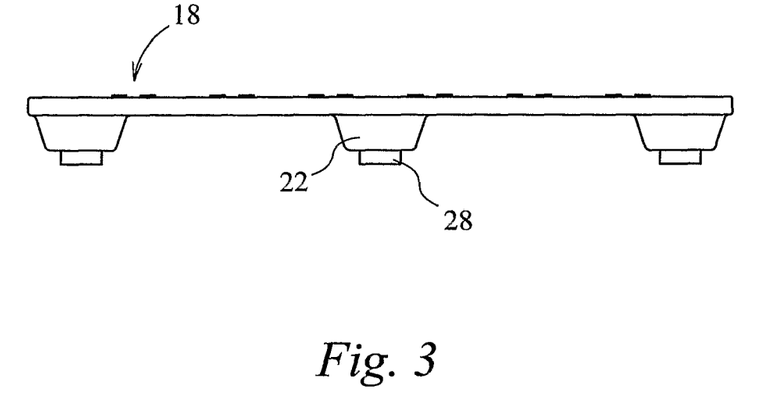
FIG. 3 illustrates a side elevation of a top pallet element for use with the pallet illustrated in FIG. 2.
Figure 4:
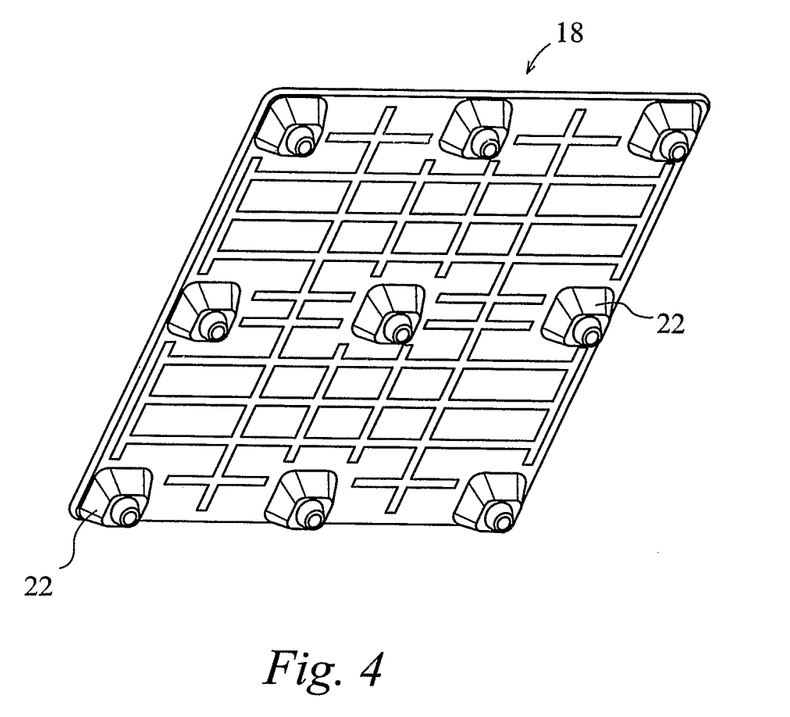
FIG. 4 illustrates an underside perspective view of the top pallet element illustrated in FIG. 3.
Figure 5:
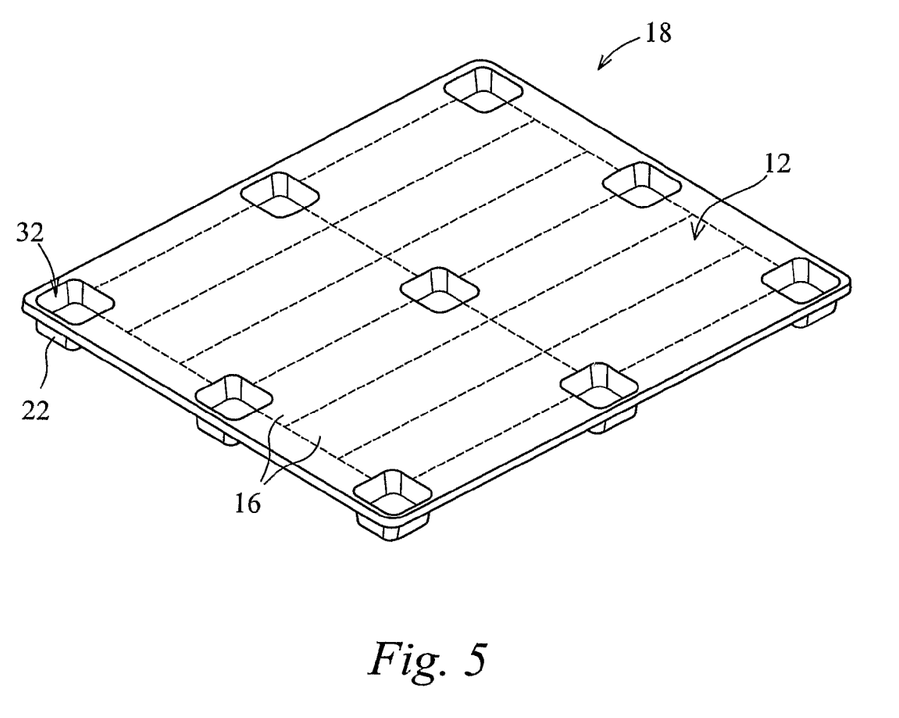
FIG. 5 illustrates a topside perspective view of the top pallet element illustrated in FIG. 3.
Figure 6:
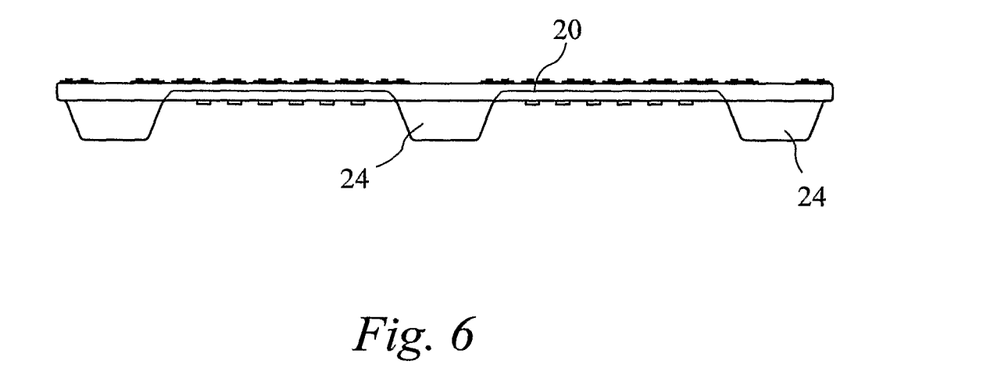
FIG. 6 illustrates a side elevation of a bottom pallet element for use with the pallet illustrated in FIG. 2.
Figure 7:
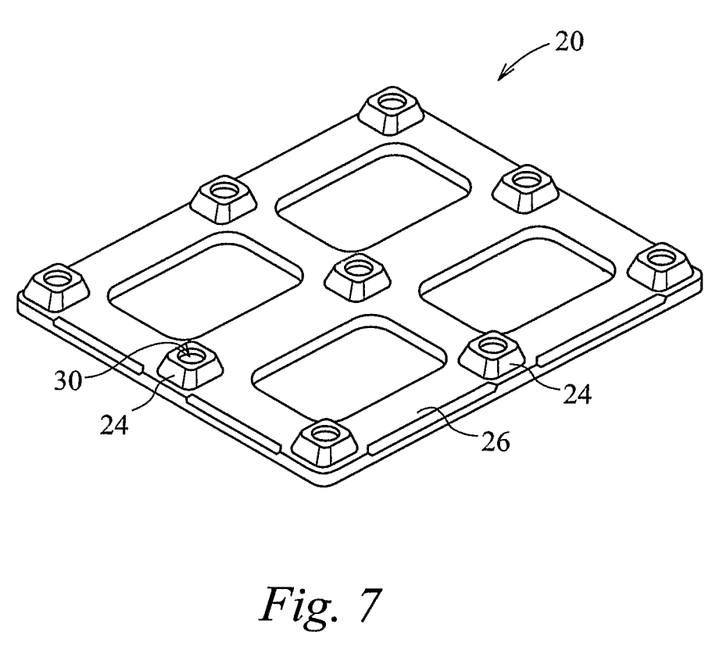
FIG. 7 illustrates an underside perspective view of the bottom pallet element illustrated in FIG. 6.

Another embodiment of the load bearing apparatus in the form of a pallet 10' will now be described with reference to 2 to 8 of the accompanying drawings, where like reference numerals denote like parts. The pallet 10' illustrated in FIG. 1 comprises two parts: being a top pallet element 18; and a bottom pallet element 20. The top pallet element 18 is illustrated in FIGS. 3 to 5 and the bottom pallet element 20 is illustrated in FIGS. 6 and 7. Each of the top and bottom pallet elements 18 and 20 comprise mutually opposable interlockingly engageable male and female feet 22 and 24 to join the top and bottom pallet elements 18 and 20 together to form the pallet 10'. In the embodiment illustrated in FIGS. 2 to 8, the top pallet element 18 has nine male feet depending from a platform 12' thereof and the bottom pallet element 20 has nine female feet upwardly extending from a base 26 thereof. As illustrated in FIGS. 4 and 7, the male feet 22 comprise extending portions 28 adapted for interlockable engagement with hole portions 30 of the female feet 24. In an alternative embodiment, the male feet are on the bottom pallet element and the female feet are on the top pallet element. Whereas the top and bottom pallet elements 18 and 20 of this embodiment are typically joined together to form the pallet 10', the top pallet element 18 without the bottom pallet element 20 can also be used as a pallet.

Figure 8:
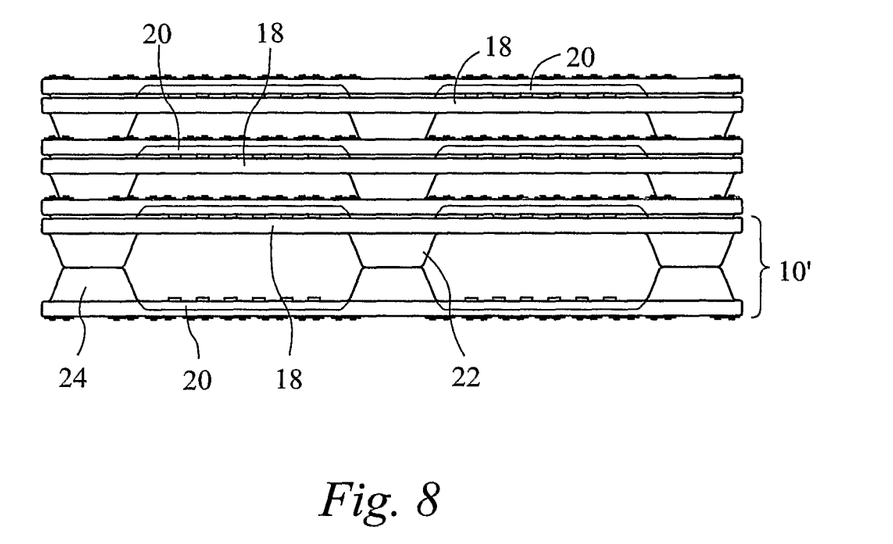
FIG. 8 illustrates a side elevation of a plurality of stacked pallet elements as illustrated in FIGS. 3 to 7.

As illustrated in FIG. 5 for example, the male feet 22 are hollow, as indicated at 32, for receiving the female feet 24. This allows for stacking of top and bottom pallet elements, as illustrated in FIG. 8.

A preferred manufacturing method is described in the Applicant's co-pending UK Patent Application Number 0505607.2, which is repeated herein, at least in part, for sake of completeness. Each above described embodiments of the pallet, 10 and 10', may be moulded individually, but are preferably moulded in batches of several pallets in a single rotational moulding operation, as described below.

To form an outer shell of the pallet, a predetermined amount of a first feedstock, which comprises HDPE and substantially no filler, is introduced into the mould and the mould is heated. The walls of the mould may be heated by any suitable heating means, for example using heating plates embedded in the walls of the mould but, in the present embodiment, the mould is heated by evenly applying direct heating to the exterior of the mould. In one embodiment, the first feedstock is softened at a temperature of about 160° and melted at a temperature of about 220°.

Probes within the mould monitor the temperature inside the mould to determine when the feedstock has melted. The probes are positioned within the mould and monitor the air temperature within the mould.

The mould is typically supported on a carriage which enables the mould to be rocked and rotated, or spun, to coat the inside surface of the mould with a layer of the first feedstock. It has been found that the surfaces of the mould may be coated sufficiently using only a low rate of rotation and only a small angle of tilting. For example, a rotation rate of about 4 rotations per minute and a tilt cycle rate of about 2 cycles per minute with a maximum angle of inclination of 15° may be sufficient to distribute the melted feedstock over the surfaces of the mould. The outer shell is therefore part formed having an outer shell composition and a cavity therein.

To form an inner core of the pallet with the cavity of the outer shell, a second feedstock comprising about 60% HDPE by weight and 40% mineral sand filler by weight is introduced into the interior of the outer shell with a foaming agent in the form of steam. The mould is continually rocked, rotated and heated during the introduction of the second feedstock into the outer shell in the mould. It is advantageous to introduce the second feedstock into the cavity of the part-formed outer shell as quickly as possible after the first feedstock has coated the surfaces of the mould. This allows a better bond to be formed between the outer shell and the inner core and reduces the cycle time for manufacturing the product. Also, as will be understood, in this way there will be no distinct boundary between the outer shell and the inner core; some mixing of the first and second feedstocks will occur at the boundary of the outer shell and the inner core.

Once the first and second feedstocks have been introduced to the mould, the mould and the product within the mould are cooled, for example by rotating the mould through a jet or stream of water, or by use of a cooling jacket about the mould.

The above described method cycle typically takes about 20 minutes.

It is noted that the effect of rocking and rotating the mould, that is rotating the mould about two axes of symmetry of the mould, can be achieved by rotating the mould about a rotational axis that is not parallel to an axis of symmetry of the mould. For example, rotating the mould about a rotational axis that is at an angle to the axis of symmetry that runs along the centre of the mould.

Rotating and/or rocking the mould may be achieved by rotating the mould about a fixed axis, for example by holding the mould in a frame. Alternatively, the rocking and rotating may be achieved by rolling the mould, for example along a track. The track may be shaped to provide a rocking motion as the mould rolls along its length.

The resultant foamed inner core composition of the pallet comprises about 3% by weight of the foaming agent and has a density of about 0.95 g/cm$^3$, although the density may fall within the range of about 0.90 to 0.96 g/cm$^3$. Whereas in the preferred embodiment, the inner core substantially fills the cavity of the outer shell, in an alternative embodiment, the inner core substantially lines the cavity of the outer shell.

Whereas the preferred manufacturing method has been described with reference to a rotational moulding and filling process, it will be understood that the pallets may be manufactured using other appropriate known methods. For some applications, rotational moulding may be preferable to, for example, blow moulding or injection moulding, since the process introduces fewer stresses into the moulded product.

A further advantage of rotationally moulding filled plastic materials is that rotational moulding apparatus is likely to be more durable and long lasting for use with such materials as those described herein.

In an alternative embodiment of the invention, the rotating and/or rocking of the mould is stopped prior to the introduction of the second feedstock to the cavity.

The filler of the preferred embodiments is typically a mineral filler such as sand, and preferably dredged sand since dredged sand has finer particles than desert sand, for example. Alternatively, the filler may comprise: a carbonate material such as calcium carbonate; another silicate material such as ground rock; a salt material such as sodium chloride; or an organic material such as straw, peanut husks, vegetable waste, flour, animal droppings or miscanthus.

The inner core comprises a unifier which enables a relatively high loading of sand with the HDPE. The inner core comprises between 0.25% and 5% by weight unifier. The unifier typically comprises an internal lubricant and/or an external lubricant. Where applicable, the internal lubricant comprises a straight or branched $C_{12}$-$C_{24}$ fatty acid amide, such as steramide. Where applicable, the external lubricant comprises a stearate.

Due to the significant difference of filler between the inner core and the outer shell, the inner core has a higher Youngs modulus than the outer shell. The inner core is also more stiff and harder than the outer shell; the outer shell is relatively softer than the inner core and more flexible. The outer shell therefore acts as an impact absorbing layer to prevent impact damage occurring to the inner core. The pallet, being able to maintain a higher inner structural integrity, is therefore better able to prevent damage compared to either a hollow pallet or a solid homogeneous pallet of similar design.

Other advantages of the invention include that, since the inner core is foamed, the pallet is relatively light. It is also relatively cheap, considering the inner core composition comprises a filler, preferably sand. Being polymeric, the pallet has improved durability compared to conventional pallets, and therefore a potentially relatively increased working life.

The pallets of the above described embodiments have dimensions corresponding to those of a standard pallet, that is about 1020×1220 millimeters (40×48 inches). In another embodiment, the pallets described above have a width and length of 1008×1209 millimeters. This allows a pallet of a single size to meet the requirements of the US pallet standard of around 1016×1220 millimeters (40×48 inches) and the requirements of the European pallet standard of around 1000×1200 millimeters.

As will be understood, alternative embodiments of the invention may comprise other feedstock components, such as pigment, for example.

While the invention has been described in reference to its preferred embodiments, it is to be understood that the words which have been used are words of description rather than limitation and that changes may be made to the invention without departing from its scope as defined by the appended claims.

The text of the abstract filed herewith is repeated here as part of the specification.

A polymeric load carrying apparatus and method of manufacture is discloses. The apparatus comprises an outer shell composition and a filled inner core composition within the outer shell composition. The outer shell composition comprises less than 10% filler, and preferably substantially no filler, by weight, and the inner core composition comprises more than 15% filler, and preferably at least 40% filler, by weight. The filler is preferably a mineral sand.

The invention claimed is:

1. A polymeric load carrying apparatus comprising:
   an outer shell composition; and
   a filled inner core composition within the outer shell composition,
   wherein the outer shell composition comprises less than 10% filler by weight and the inner core composition comprises more than 15% filler by weight and the inner core composition is stiffer than the outer shell composition and wherein the inner core composition is foamed.

2. The load carrying apparatus of claim 1 wherein the filler comprises a mineral filler.

3. The load carrying apparatus of claim 1 wherein the outer shell composition comprises less than 5% mineral filler by weight.

4. The load carrying apparatus of claim 1 wherein the outer shell composition comprises substantially no filler.

5. The load carrying apparatus of claim 1 wherein the inner core composition comprises at least 20% mineral filler by weight.

6. The load carrying apparatus of claim 1 wherein the inner core composition comprises at least 40% mineral filler by weight.

7. The load carrying apparatus of claim 1 wherein the inner core composition and the outer shell composition comprises polyethylene and preferably HDPE.

8. The load carrying apparatus of claim 1 wherein the inner core composition comprises foamed HDPE having a density of about 0.8 to 0.98 g/cm$^3$.

9. The load carrying apparatus of claim 1 wherein the mineral filler comprises a silicate material, preferably sand.

10. The load carrying apparatus of claim 1 wherein the mineral filler comprises a carbonate, preferably calcium carbonate.

11. The load carrying apparatus of claim 1 wherein the apparatus is a pallet.

12. A method of manufacturing a polymeric load bearing apparatus comprising the steps of:
   introducing a first feedstock into a mould, the first feedstock comprising a polymer and less than 10% filler;
   rotating and heating the mould to at least partially form an outer shell of the load bearing apparatus;
   introducing a second feedstock into the outer shell to form a foamed inner core within the outer shell, the second feedstock comprising a foaming agent, a polymer and more than 15% filler; and
   cooling the mould to form the load bearing apparatus having an inner core that is stiffer than the outer shell.

13. The method of claim 12 wherein the polymer of both of the first and second feedstocks is polyethylene and preferably HDPE.

14. The method of claim 12 wherein the filler is a mineral filler and preferably sand.

15. The method of claim 12 wherein the second feedstock comprises at least 20% filler by weight.

16. The method of claim 12 wherein the second feedstock comprises at least 40% filler by weight.

17. The method of claim 12 wherein the inner core comprises about 3% foaming agent by weight.

18. The method of claim 12 wherein the step of rotating and heating the mould is continued during the step of introducing the second feedstock.

19. The method of claim 12 wherein the load bearing apparatus has a middle portion surrounded by the inner core that is hollow.

* * * * *